Aug. 27, 1957   J. R. BAYSTON   2,803,950
ICE MAKING MACHINES
Filed July 1, 1953   3 Sheets-Sheet 1

Inventor
John R. Bayston
By L. F. Hammand Atty

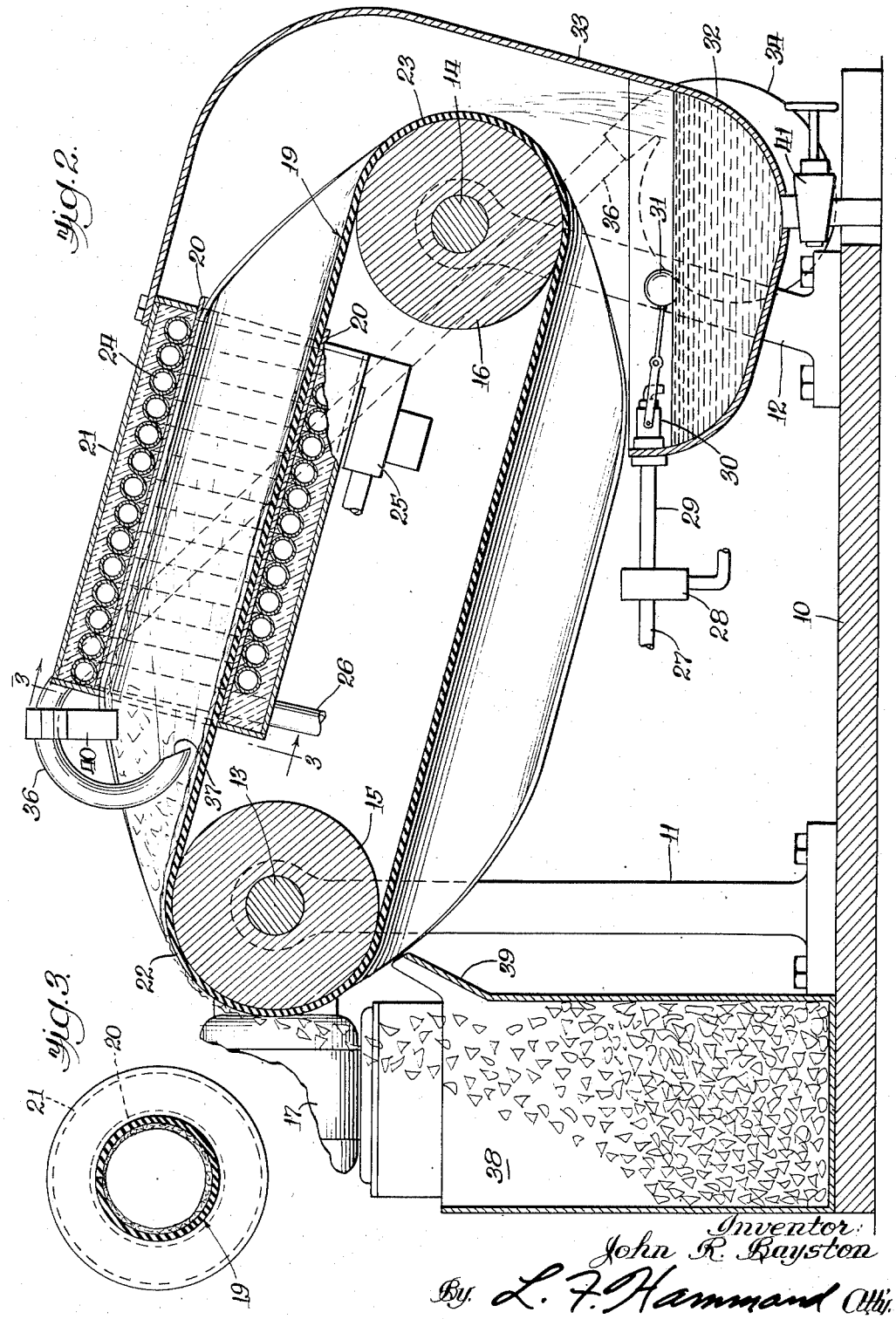

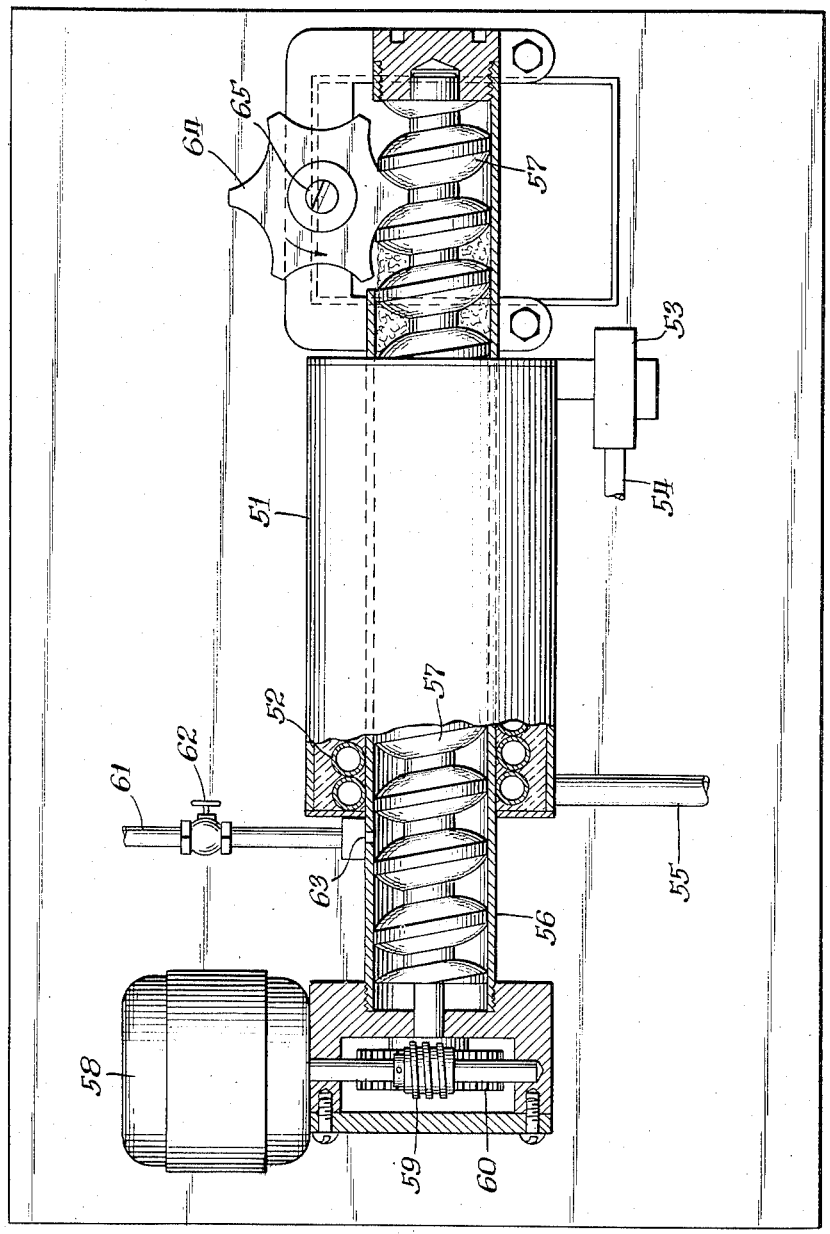

United States Patent Office 2,803,950
Patented Aug. 27, 1957

2,803,950

ICE MAKING MACHINES

John R. Bayston, Van Nuys, Calif.

Application July 1, 1953, Serial No. 365,307

7 Claims. (Cl. 62—107)

This invention relates to ice making equipment, and more specifically to automatic ice making machines adapted to produce ice as a continuous process, break the ice into chip form as its freezing is completed, and deliver it into a bin or other convenient receptacle where it will be easily and conveniently available.

The principles of the invention may be of rather broad application and the machine may be made in any size, but it is a specific object of this disclosure to provide a mechanism so designed and constructed as to constitute a relatively small and comparatively inexpensive self-contained freezing unit, practicable for use in small drug stores, soda fountains, bars, soft drink stands, or other establishments requiring a continuous and dependable supply of chipped ice in moderate amounts.

It is a further object of the invention to provide an ice making machine wherein the mechanism itself is of easily understood design and operation, so that it is practicable for installation and use by any ordinary small shop owner, and so that it may be properly maintained and serviced by any competent refrigeration mechanic.

An illustrative embodiment of the invention is shown in the drawings of the present specification, wherein:

Figure 2 is a longitudinal sectional view through the machine, taken substantially on the plane of the line 2—2 of Figure 1;

Figure 3 is a detail sectional view taken substantially on the plane of the line 3—3 of Figure 2, and illustrating the manner in which the freezing conveyor operates to effect breaking the ice into the desired small particles; and Figure 4 is a plan view, partly in section, showing a modified form of the invention.

Figure 1:
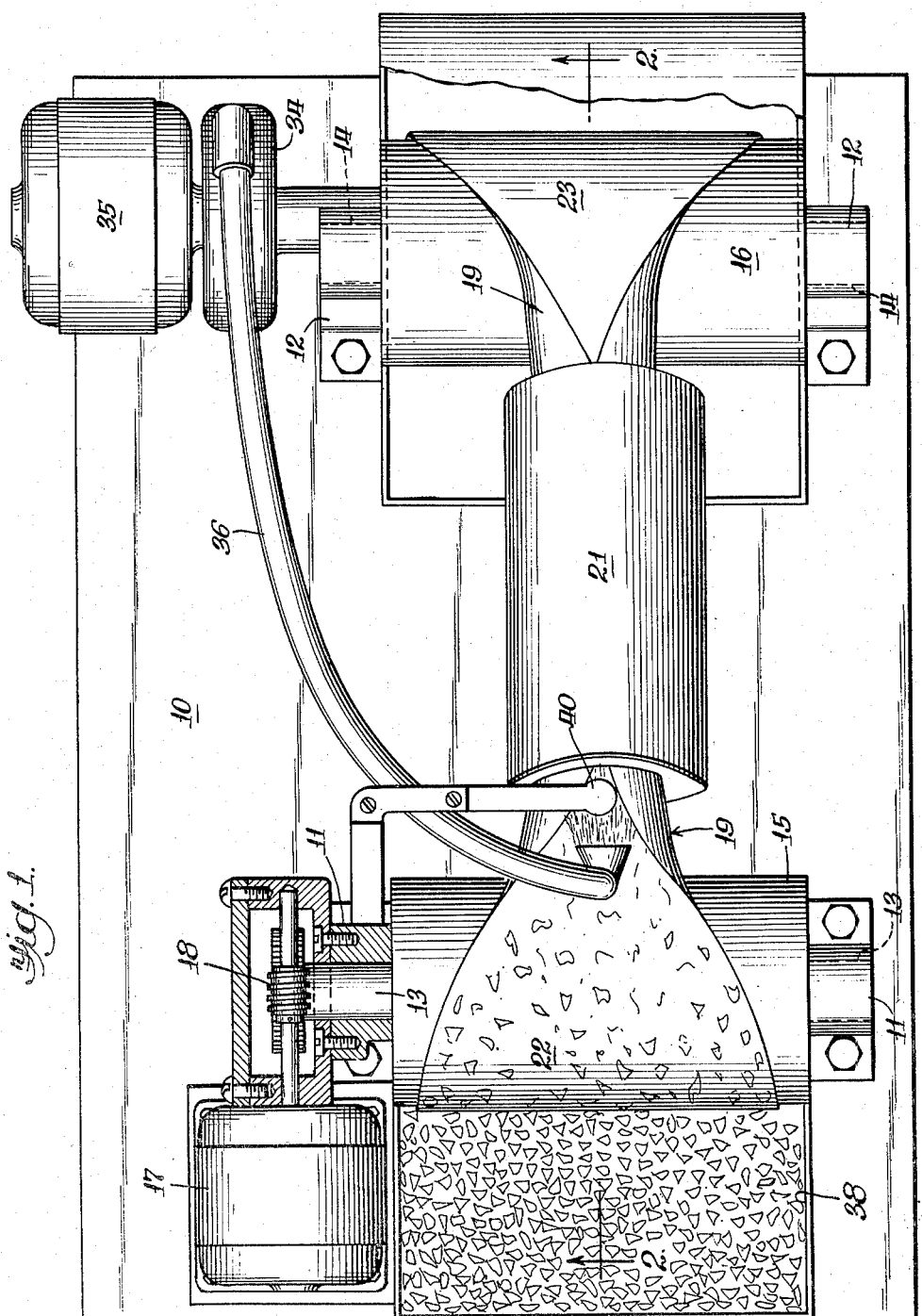
Figure 1 is a plan view of an ice making machine constructed in accordance with these teachings.

As illustrated, the machine comprises a base 10 upon which upright supports 11 and 12 are mounted to carry the moving parts of the mechanism. The supports 11 and 12 are journaled to receive rotatable shafts 13 and 14 respectively, upon which a driving pulley 15 and an idler pulley 16 are mounted. The pulley 15 is driven by a motor 17 and reduction gearing 18.

The pulleys 15 and 16 carry a flexible tubular conveyor 19 extending between them. The surfaces of the pulleys 15 and 16 may be flat, as illustrated, or may be concave, convex or irregularly shaped to flex the conveyor carried thereby in any desired manner.

The conveyor 19 is actually an endless split tube comprising a lower portion extending directly between the pulleys 15 and 16, with an upper tubular portion similarly mounted but extending through and fitted closely within the central metal sleeve 20 of a freezing evaporator 21. Thus the conveyor may function as a flexible belt, which opens up into flattened portions 22 and 23 as it passes around the pulleys 15 and 16, respectively.

The freezing evaporator 21 includes a coiled refrigerant line 24 extending from an expansion valve 25 at the inlet connection to an outlet connection 26. It is to be understood that this evaporator may be connected to the compressor and condenser of any conventional type of refrigerating system, so that the inner cylindrical sleeve 20 is maintained at an appropriate freezing temperature, but inasmuch as the refrigeration system may be of any conventional type, it is not further illustrated in the present drawings.

Water is supplied to the machine through a supply line 27 which may be provided with any conventional type of shut-off valve 28, from which the line 29 extends to a float valve 30 arranged for actuation by a float 31 positioned within the water reservoir 32. Preferably, this reservoir is positioned immediately below the lower conveyor pulley 16 and, as illustrated, an end wall 33 extends upwardly from the reservoir around the pulley 16 and to the lowermost end of the evaporator 21, so that any water overflowing from the upper run of the freezing conveyor 19 will flow downwardly into the reservoir.

In the operation of the machine, water from the reservoir 32 is introduced into the inside of the upper run of the split tubular conveyor belt 19, so that it will be frozen on the innermost surfaces thereof. To this end, a water pump 34 and motor 35 are provided, the arrangement being such that water from the reservoir 32 is drawn into the pump 34 and projected upwardly through a flow tube 36 to a spray nozzle 37 at the upper (left) end of the evaporator. The operation of the pump causes water from the nozzle 37 to flow into the open end of the upper run of the tubular conveyor belt, and since the temperature of this portion of the belt is held at a point well below freezing, a cylindrical layer of ice will be gradually formed upon the belt as it passes through the evaporator.

In operation, the conveyor belt 19 is slowly but positively moved upwardly and to the left, and drawn through the central cylindrical sleeve 20 of the evaporator 21. As heretofore mentioned, an internal cylindrical layer of ice is formed within the upper tubular portion of the conveyor as it progresses, and any excess water which is not frozen in the process drains downwardly toward the pulley 16 and is returned to the reservoir 32. It follows that the machine in operation may utilize the freezing capacity of the evaporator to its fullest extent, and that the thickness of the layer of ice formed on the inner surfaces of the split tube conveyor will be governed by the temperature of the evaporator and the speed of motion of the belt. Any surplus water which is returned to the reservoir will effect a precooling of water from the incoming supply line, so that the thermal efficiency of the machine will be high.

As the upper run of the conveyor moves out of the evaporator and approaches the driving pulley 15, it will tend to open outwardly and change form, gradually changing from a cylindrical to a flat or somewhat flattened shape. Thus the surfaces of the conveyor belt upon which the ice is formed are concave while in the evaporator, but open outwardly as the belt approaches and passes around the driving pulley 15. This flexing of the belt will necessarily cause the cylindrical ice layer within it to be broken up into comparatively small, pebble size ice particles, which fall to the ice bin 38 by gravity. A scraper blade 39 is provided to dislodge any particles of ice which may tend to cling to the surfaces of the conveyor belt as it passes around the driving pulley 15.

If desired, a spreader 40 may be positioned adjacent the discharge end of the evaporator to insure proper separation of the split edges of the tubular conveyor belt as it leaves the evaporator.

From the above it will be seen that in the normal operation of the mechanism, the float valve 30 will function to maintain a constant supply of water in the reservoir 32, while the motor driven water pump 34 will supply water to the spray nozzle 37. The nozzle 37 will function to inject water into the portion of the split tube conveyor belt lying within the evaporator 21, and the low temperatures created by the evaporator will cause a cylindrical layer of ice to form on the inner surfaces of the belt. The continuous water flow afforded by the nozzle 37 will be effective to wash away impurities and air within the ice layer, so that the ice formed within the evaporator will be crystal clear. Any excess water will be cooled somewhat as it passes through the evaporator, and will thus tend to precool the water in the reservoir of the machine so that the cooling effect of the evaporator is not lost. As the machine continues to produce ice the water in the tank becomes concentrated with solids that have been washed from the surface of the ice, together with a molecule of air that is attached to each particle of solids. By removing these two substances by means of a water flow, the resultant ice will be clear. When the machine starts to produce cloudy ice, it is generally due to the fact that the dreg water needs draining. The frequency of such draining will be determined by the mineral content of the water and the size of the reservoir. I have therefore shown a drain cock 41 near the bottom of the reservoir which may be opened either while the machine is or is not in operation. If desired, an automatic siphon may be set in such a position so that when the machine is turned off, the circulating water returning to the tank will raise the level of the water in the tank sufficiently high to start the operation of the siphon, thus emptying the tank.

As the ice layer is being formed in the normal operation of the machine, the conveyor is slowly but positively moved upwardly and to the left, so that the machine functions as a continuous ice making process wherein the ice layer begins to form at the right hand end of the evaporator and becomes fully formed to the desired ice thickness as the belt emerges from the cold zone. It is to be particularly noted that the ice is freed from the conveyor belt by an unrolling action thereof, so that the surface ice is subjected to tension rather than to a compressive force, and is thus freed from the belt positively and with a minimum expenditure of mechanical power. Thus, the ice deposited in the receptacle 38 is in the form of small, comparatively dry, broken chips of a character and size ideal for the intended purposes.

The form of the invention illustrated in Figure 4 of the present drawings employs an evaporator 51 having an internal refrigerant coil 52, with an expansion valve 53, inlet line 54, and outlet connection 55, which may be in all respects the same as the evaporator parts heretofore described. Also, the evaporator 51 is provided with an inner metallic cooling sleeve or cylinder 56 similar to the cylinder 20, but in the form of the invention illustrated in Figure 4, the conveyor utilized for moving the water and ice through the evaporator and the means employed for dislodging it from its freezing surfaces is somewhat modified. In the machine of Figure 4, the inner cylindrical sleeve 56 of the evaporator 51 is provided with a conveyor comprising a longitudinally extending helical screw 57. The screw 57 is rotatably driven by an electric motor 58 through a suitable worm 59 and gear 60.

Water is introduced into the sleeve 56 through an inlet line 61 and shut-off valve 62 which feeds water to an orifice 63 in the sleeve 56. The water introduced into the orifice 63 is moved to the right by the screw conveyor 57 and is caused to solidify into a pulpy state as it passes through the cold zone of the evaporator. As the ice emerges from the evaporator, it is chipped from the threads of the screw conveyor by a star wheel 64 pivoted on a stud 65 and arranged to be rotated by the rotating movement tof the conveyor. The star wheel 64 has its individual teeth cut to fit the surface contour of the threads of the screw conveyor 57, so that the rotation of the conveyor against the star wheel causes the teeth thereof to effectively dislodge the ice, which emerges from the evaporator in pulverized form. The ice thus manufactured by the machine falls from the star wheel into any suitable type of receptacle (not shown), so that a constant supply of pulverized ice is always available when the machine is in operation.

From the above it will be seen that the mechanisms described herein provide simple yet efficient means of continuously manufacturing pulverized ice, together with mechanisms for effectively dislodging the ice from the surfaces upon which it is frozen, and thus rendering it easily and conveniently available for use.

Having thus described my invention, what I claim as new and desire to protect by United States Letters Patent is:

1. In a machine for continuously producing chipped ice, a freezing evaporator comprising a generally cylindrical sleeve having refrigerant therearound in heat transfer relation therewith; together with a conveyor of size corresponding to the interior diameter of the aforementioned evaporator sleeve and extending therethrough in surface contact therewith; together with power means driving said conveyor to move ice and water progressively through the freezing evaporator at a predetermined regular rate, with means for injecting water into the portion of said sleeve within the evaporator whereby ice is formed therein, and a rotatable power driven device directly engaging the aforementioned conveyor and located beyond the discharge end of the evaporator for dislodging chips of ice from the surfaces of the conveyor.

2. In a machine for continuously producing chipped ice, a freezing evaporator comprising a generally cylindrical sleeve having refrigerant therearound in heat transfer relation therewith; together with a freezing conveyor consisting of a longitudinally split flexible tube of size and shape corresponding to the interior diameter of the aforementioned evaporator sleeve and extending therethrough in surface contact therewith; said tube being in the form of an endless loop extending around and between opposed pulleys at the opposite ends of said evaporator; together with power means for continuously rotating said pulleys to move said tube progressively through the freezing evaporator at a predetermined regular rate, means for injecting water into the portion of said tube within the evaporator whereby a cylindrical layer of ice is formed on the interior concave surfaces thereof, and means for opening said split tube and spreading its opposite edges apart from each other as it leaves the evaporator whereby the ice layer formed thereon is flexed under tension and is thus broken into relatively small chips and freed from the surfaces of the freezing conveyor.

3. In a machine for continuously producing chipped ice, a freezing evaporator comprising a generally cylindrical sleeve having refrigerant therearound in heat transfer relation therewith; together with a freezing conveyor consisting of a longitudinally split flexible tube of size and shape corresponding to the interior diameter of the aforementioned evaporator sleeve in surface contact therewith; together with power means for moving said tube through the freezing evaporator, means for injecting water into said tube within the evaporator whereby a cylindrical layer of ice is formed on the interior concave surfaces thereof, and means for opening said split tube and spreading its opposite edges apart from each other after it leaves the evaporator whereby the ice formed therein is free from the surfaces of the freezing conveyor.

4. In a machine for continuously producing chipped ice, a freezing evaporator together with a freezing conveyor consisting of a longitudinally split flexible tube; together with power means for moving said tube through the freezing evaporator, means for injecting water into said tube, and means for opening said split tube and spreading its opposite edges apart from each other after it leaves the evaporator whereby the ice formed therein is freed from the surfaces of the freezing conveyor.

5. In a machine for continuously producing chipped ice, a freezing evaporator comprising a generally cylindrical sleeve having refrigerant therearound in heat transfer relation therewith, with a freezing conveyor consisting of a helical screw of diameter corresponding to the internal diameter of said sleeve and extending through the said cylindrical sleeve of the evaporator and in surface contact therewith throughout its length, together with means for injecting water into the sleeve of the evaporator and mechanism for driving said conveyor whereby the water is slowly conveyed through the evaporator as it is frozen therein, with means at the discharge end of the evaporator for breaking and chipping said ice as it is discharged from the evaporator and conveyor, said means for freeing the ice from said conveyor comprising a star wheel having a plurality of teeth in mesh with the screw conveyor and driven thereby.

6. In a machine for continuously producing chipped ice, a freezing evaporator comprising a generally cylindrical sleeve having refrigerant therearound in heat transfer relation therewith, with a freezing conveyor consisting of a helical screw of diameter corresponding to the internal diameter of said sleeve and extending through the said cylindrical sleeve of the evaporator and in surface contact therewith throughout its length, together with means for injecting water into the sleeve of the evaporator and mechanism for driving said conveyor whereby the water is slowly conveyed through the evaporator as it is frozen therein, with a rotatable power driven device directly engaging the aforementioned conveyor and located beyond the discharge end of the evaporator for dislodging chips of ice from the surfaces of the conveyor.

7. In a machine for continuously producing chipped ice, a freezing evaporator comprising a generally cylindrical sleeve having refrigerant therearound in heat transfer relation therewith; together with a conveyor of size corresponding to the interior diameter of the aforementioned sleeve of the freezing evaporator and extending therethrough in surface contact therewith; together with power means driving said conveyor to move ice and water progressively through the freezing evaporator at a predetermined regular rate, and a water reservoir disposed below said freezing evaporator and adapted to receive excess water drained from said freezing evaporator; means for supplying water to said reservoir and means for injecting water from the reservoir into said freezing evaporator to effect recirculation of water through said evaporator and said reservoir to simultaneously accomplish progressive freezing of the water within the freezing evaporator and precooling of the water in the reservoir, means for injecting water into the portion of said sleeve within the evaporator whereby ice is formed therein, and a rotatable power driven device directly engaging the aforementioned conveyor and located beyond the discharge end of the evaporator for dislodging chips of ice from the surfaces of the conveyor.

References Cited in the file of this patent

UNITED STATES PATENTS

| | | |
|---|---|---|
| 178,647 | Lafferty | June 13, 1876 |
| 1,878,759 | Copeman | Sept. 20, 1932 |
| 1,963,842 | Gay | June 19, 1934 |
| 2,063,770 | Taylor | Dec. 8, 1936 |
| 2,071,465 | Huber | Feb. 23, 1937 |
| 2,374,997 | Hill | May 1, 1945 |
| 2,556,510 | Topping | June 12, 1951 |
| 2,575,374 | Walsh | Nov. 20, 1951 |
| 2,595,588 | Lee | May 6, 1952 |
| 2,597,515 | Nitsch | May 20, 1952 |
| 2,602,304 | Randell | July 8, 1952 |
| 2,682,155 | Ayres | June 29, 1954 |
| 2,701,452 | Hopkins | Feb. 8, 1955 |
| 2,721,452 | Brandin | Oct. 25, 1955 |
| 2,730,226 | Day | Jan. 10, 1956 |
| 2,746,263 | Field | May 22, 1956 |
| 2,753,694 | Trow | July 10, 1956 |